(12) United States Patent
Hays et al.

(10) Patent No.: US 9,308,726 B2
(45) Date of Patent: Apr. 12, 2016

(54) PRINTHEAD FLUID PATHS FORMED WITH SACRIFICIAL MATERIAL PATTERNED USING ADDITIVE MANUFACTURING PROCESSES

(75) Inventors: Andrew Wayne Hays, Fairport, NY (US); Peter J Nystrom, Webster, NY (US)

(73) Assignee: Xerox Corporation, Norwalk, CT (US)

(*) Notice: Subject to any disclaimer, the term of this patent is extended or adjusted under 35 U.S.C. 154(b) by 172 days.

(21) Appl. No.: 13/397,809

(22) Filed: Feb. 16, 2012

(65) Prior Publication Data

US 2013/0215197 A1   Aug. 22, 2013

(51) Int. Cl.
*B41J 2/16*   (2006.01)

(52) U.S. Cl.
CPC *B41J 2/161* (2013.01); *B41J 2/164* (2013.01); *B41J 2/1623* (2013.01); *B41J 2/1628* (2013.01); *B41J 2/1629* (2013.01); *B41J 2/1634* (2013.01); *B41J 2/1639* (2013.01); *B41J 2/1642* (2013.01); *Y10T 29/42* (2015.01); *Y10T 29/49083* (2015.01); *Y10T 29/49126* (2015.01); *Y10T 29/49401* (2015.01)

(58) Field of Classification Search
CPC ........ B41J 2/161; B41J 2/1628; B41J 2/1269; B41J 2/1634; B41J 2/1639; B41J 2/1642; B41J 2/164; B41J 2/1623; Y10T 29/42; Y10T 29/49401; Y10T 29/49083; Y10T 29/49126

USPC ............ 29/890.1, 25.35, 611, 83; 216/41, 42, 216/62, 87; 427/272, 307
See application file for complete search history.

(56) References Cited

U.S. PATENT DOCUMENTS

| | | | |
|---|---|---|---|
| 5,521,030 A * | 5/1996 | McGrew ..................... 216/41 X |
| 6,986,980 B2 * | 1/2006 | Kubota et al. ............ 29/890.1 X |
| 7,506,442 B2 * | 3/2009 | Shim et al. .................... 29/890.1 |
| 7,691,280 B2 * | 4/2010 | Waldrop et al. ................. 216/87 |
| 7,735,225 B2 | 6/2010 | Nystrom et al. |
| 2004/0021745 A1 * | 2/2004 | Mouri et al. .......... B41J 2/1642 |
| 2004/0027422 A1 * | 2/2004 | Kubota et al. ................... 347/61 |
| 2005/0239953 A1 * | 10/2005 | Sakurai et al. ................ 524/588 |

FOREIGN PATENT DOCUMENTS

JP   2003053700 A * 2/2003

* cited by examiner

*Primary Examiner* — A. Dexter Tugbang
(74) *Attorney, Agent, or Firm* — MH2 Technology Law Group, LLP

(57) ABSTRACT

A method for forming an ink jet printhead subassembly can include the use of a sacrificial form coated with a coating material to fabricate a printhead subassembly having a plurality of ink channels configured for flowing ink therethrough. The sacrificial form can be manufactured using one or more described techniques. Subsequently, the sacrificial form may be removed from the coating material to provide a printhead subassembly including the coating material and an ink channel through the coating material. The completed printhead subassembly can include a single solid structure manufactured from a single material, or can include more than one solid structures assembled together.

13 Claims, 6 Drawing Sheets

PRINTHEAD FLUID PATHS FORMED WITH SACRIFICIAL MATERIAL PATTERNED USING ADDITIVE MANUFACTURING PROCESSES

FIELD OF THE EMBODIMENTS

The present teachings relate to the field of printing devices, and more particularly to printing devices including printheads such as ink jet printheads.

BACKGROUND OF THE EMBODIMENTS

Printing an image onto a print medium such as paper for consumer and industrial use is dominated generally by laser technology and ink jet technology. Ink jet technology has become more common as ink jet printing resolution and print quality have increased. Ink jet printers typically use either thermal ink jet technology or piezoelectric technology. Even though they are more expensive to manufacture than thermal ink jets, piezoelectric ink jets are generally favored, for example, because they can use a wider variety of inks.

Piezoelectric ink jet printheads typically include a flexible diaphragm manufactured from, for example, stainless steel. Piezoelectric ink jet printheads can also include an array of piezoelectric transducers (i.e., actuators) attached to the diaphragm. Other printhead structures can include one or more laser-patterned dielectric standoff layers and a flexible printed circuit (flex circuit) or printed circuit board (PCB) electrically coupled with each transducer. A printhead can further include a body plate, an inlet/outlet plate, and an aperture plate, each of which can be manufactured from stainless steel. The aperture plate includes a plurality of nozzles (i.e., one or more openings, apertures, or jets) through which ink is dispensed during printing.

During use of a piezoelectric printhead, a voltage is applied to a piezoelectric transducer, typically through electrical connection with a flex circuit electrode electrically coupled to a voltage source, which causes the piezoelectric transducer to bend or deflect, resulting in a flexing of the diaphragm. Diaphragm flexing by the piezoelectric transducer increases pressure within an ink chamber and expels a quantity of ink from the chamber through a particular nozzle in the aperture plate. As the diaphragm returns to its relaxed (unflexed) position, it reduces pressure within the chamber and draws ink into the chamber from a main ink reservoir through an opening to replace the expelled ink.

The complex three-dimensional microfluidic channels (ink ports) for ink jet printheads can be fabricated by assembling a plurality of layers which can include a number of different materials such as one or more laser patterned polymers, etched stainless steel layers, and aluminum layers. The manufacturing process can include stacking the layers within a press and applying high pressure and temperature. A plurality of adhesive films are used to effect bonding of the material layers together. An adhesive cure cycle can include the application of the pressure and temperature on the layer stack within the press for an extended duration of time, for example two hours, to minimize delamination of the layers and premature failure of the printhead during use. The adhesives which bond the various printhead layers together are formulated for both their bonding reliability and their compatibility with solid and ultraviolet inks.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, a method for forming a printhead can include coating a sacrificial form with a coating material, wherein the sacrificial form defines an ink channel configured for the flow of ink through the printhead, and removing the sacrificial form from the coating material to provide a printhead subassembly or body comprising the coating material and an ink channel through the coating material.

In another embodiment of the present teachings, an ink jet printhead can include a printhead body formed from a single piece of material, a diaphragm attached to the printhead body with a diaphragm adhesive, and a plurality of ink channels through the printhead body, wherein the plurality of ink channels through the printhead body are configured for the passage of ink between the diaphragm attached to the printhead body and a plurality of nozzles in an aperture plate during printhead printing.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to the exemplary embodiments of the present teachings, examples of which are illustrated in the accompanying drawings. Wherever possible, the same reference numbers will be used throughout the drawings to refer to the same or like parts.

As used herein unless otherwise specified, the word "printer" encompasses any apparatus that performs a print outputting function for any purpose, such as a digital copier, a bookmaking machine, a facsimile machine, a multi-function machine, a plotter, etc.

The word "polymer" encompasses any one of a broad range of carbon-based compounds formed from long-chain molecules including thermosets, thermoplastics, resins such as polycarbonates, epoxies, and related compounds known to the art.

One manufacturing process for solid ink jet stacks involves laminating or brazing many layers of patterned metal or polymer sheets. Each layer must be formed, for example, by the manufacturer or a supplier using various patterning, laser drilling, and punching techniques, transported to a printhead manufacturing facility if provided by a supplier, then cleaned, stacked, and bonded before being attached to an ink reservoir. Layer to layer alignment must be maintained, layer to layer bonding must be satisfactory, and cleanliness must be maintained throughout the process to prevent contamination from blocking the nozzles during use. Chemical formulations of material layers and the adhesives which connect the layers together must be compatible with the ink that will come into contact with the adhesives and layers. The adhesives which connect the layers together must be sufficiently reliable to prevent delamination of the different material layers, for example which can result from differences in the thermal coefficient of expansion during heating and cooling or from pressures within the printhead during use.

Figure 9:
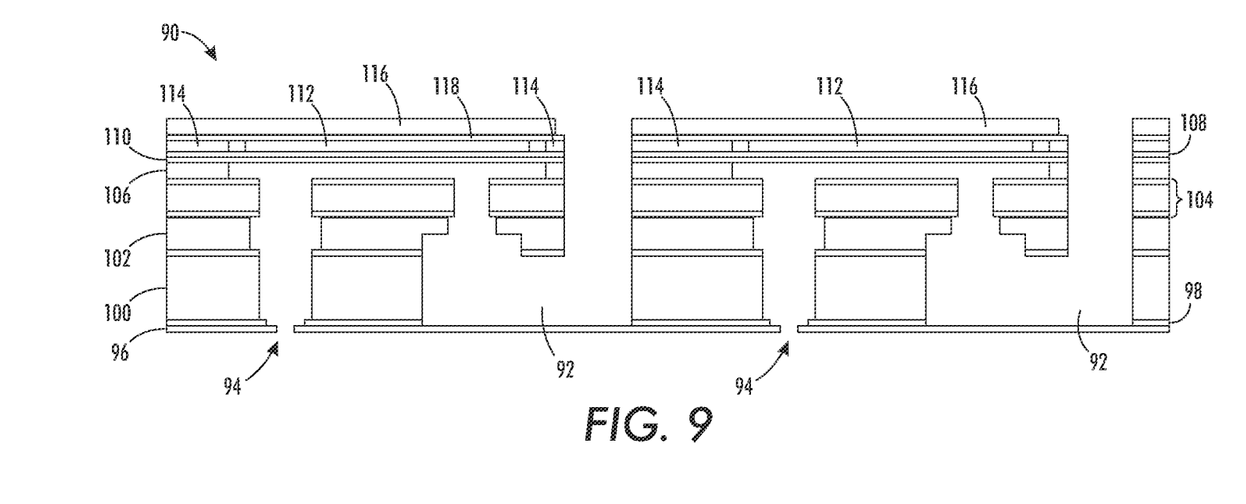
FIG. 9 is a cross section of a printhead subassembly formed using a plurality of laminated layers.

FIG. 9 depicts a printer subassembly, and more particularly part of an ink jet printhead 90, which can be formed by physically connecting several layers together using adhesive layers. FIG. 9 generally depicts a pair ink ports 92, each for the passage of ink from an ink reservoir (not depicted for simplicity) to an aperture (nozzle) 94 within an aperture plate 96 during printing. An aperture plate adhesive 98 connects the aperture plate 96 to an inlet/outlet plate or manifold 100. FIG. 9 further depicts a separator layer 102, a vertical inlet 104 which can include a plurality of layers, a body plate 106, a diaphragm 108 attached to the body plate 106 with a diaphragm attach adhesive 110, piezoelectric actuators 112, a standoff layer 114, and a circuit layer 116 attached to the standoff layer 114 and the piezoelectric actuator 112 with an adhesive layer 118. Various other printhead layers can be included depending on the device design, which are not described for simplicity. A printhead structure can have hundreds or thousands of ink ports 92 and nozzles 94 within the aperture plate 96. To connect the various layers together, the assembly can be precisely aligned, gimbaled to maintain alignment, and placed into a stack press at a temperature of about 300° C. and a pressure of about 300 psi for about two hours to cure the adhesive.

An embodiment of the present teachings can be used to form a printhead structure, such as a structure which is analogous to various elements of FIG. 9. The method can include the formation and use of a sacrificial form to form a printhead structure having a reduced number of layers compared to some other printhead structures. The sacrificial form can be manufactured using, for example, an additive manufacturing process. In an embodiment, the sacrificial form can then be used during a method to form a printhead subassembly from a single layer. For example, as discussed below, a single solid structure can replace various layers from the diaphragm 108 forward up to and including the aperture plate 96 using an additive manufacturing to produce the sacrificial form. The sacrificial form can then be cast or coated with a suitable material, for example a sprayed-on encapsulant such as epoxy, a metal layer formed using a plating process, or a material deposited using a chemical process such as chemical vapor deposition (CVD), injection molding, etc. Once coated, the material of the sacrificial form can be removed, for example by melting and draining the sacrificial material or by using a solvent to dissolve the sacrificial material. Once the sacrificial material is removed, any finishing processing can be performed and the completed printhead subassembly can be bonded to other printhead structures such as a diaphragm to form a front end of the jet stack. The resulting structure may have a reduced cost, improved yield, and longer lifetime than current printhead structures. An embodiment of the present teachings can be used to form a printhead structure which has similar functionality to the structure of FIG. 9, but which has a reduced number of layers.

Figure 1:
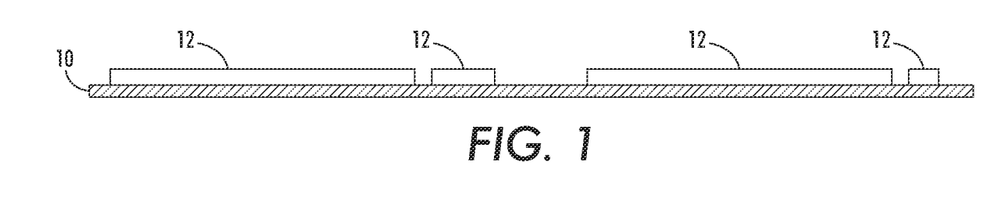
FIGS. 1-5 are cross sections depicting formation of an ink jet printhead using a sacrificial form according to an embodiment of the present teachings.

An embodiment of a process to provide a sacrificial form is depicted in the cross sections of FIGS. 1-4. FIG. 1 depicts a base 10 upon which a sacrificial form can be fabricated, for example using an additive manufacturing process to stack a plurality of individual sacrificial layers to provide a three dimensional patterned form. The sacrificial form can be manufactured to have a 3D shape which is essentially a negative mold of the desired fluid path for an ink jet printhead. A patterned sacrificial first layer 12, and additional sacrificial layers subsequently formed, can be provided by any sufficient technique. In one embodiment, a continuous planar sacrificial material can be deposited across the base 10 and then patterned using, for example, a laser etch technique or patterned by masking then etching with a wet or dry etch to result in patterned layer 12. In another embodiment, layer 12 can be manufactured from a film which is patterned off the base 10 using a laser etch technique, then applied to the base 10 as a self-adhesive layer or using a separate adhesive. To form precise layers and/or layers having small feature sizes, an optical lithography masking process with a wet and/or dry etch can be used to form each layer of the sacrificial form.

The solid sacrificial form can be fabricated from a solid material which can be removed through, for example, conversion to a liquid or by dissolving with a solvent. Various waxes and synthetic materials are contemplated. For example, the sacrificial form can be manufactured from Apiezon® Wax W available from Apiezon of Manchester, England, which has a melting temperature of about 130° C., a softening temperature of about 90° C., and which is soluble in a hydrocarbon solvent such as hexane. The sacrificial form can also be manufactured from Crystalbond™ 590 available from Aremco Products Inc. of Valley Cottage, N.Y., which has a flow point of about 150° C., and which is soluble in isopropyl alcohol or other solvents available from the supplier. Further, the sacrificial form may be produced with a solid ink printed by a materials printer. In an embodiment, the sacrificial form can manufactured from a thermoplastic such as polymethyl methacrylate (PMMA), which is dissolvable in acetone. The use of two or more different materials or two or more layer fabrication techniques is contemplated.

Figure 2:
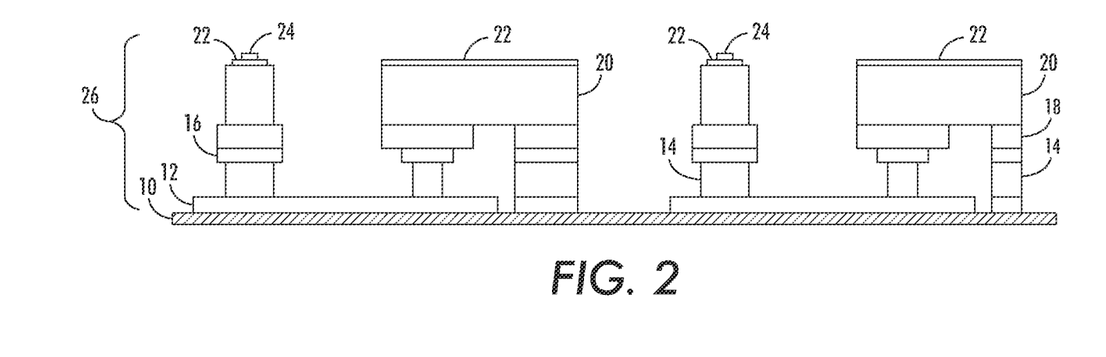

Once sacrificial first layer 12 is formed as depicted in FIG. 1, any additional layers are subsequently formed and built up on the base 10 to provide a completed sacrificial form 26 as depicted in FIG. 2 having the desired 3D ink path shape. FIG. 2 depicts an exemplary completed form 26, which includes patterned layers 12-24. In this embodiment, the shape of the completed form 26 defines at least part of an ink fluid path through an ink jet printhead, such that the ink will flow where the solid material is present.

Figure 3:
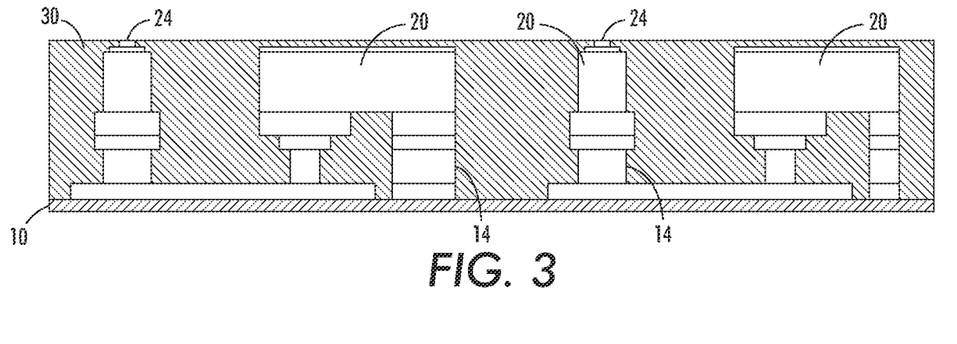
Figure 4:
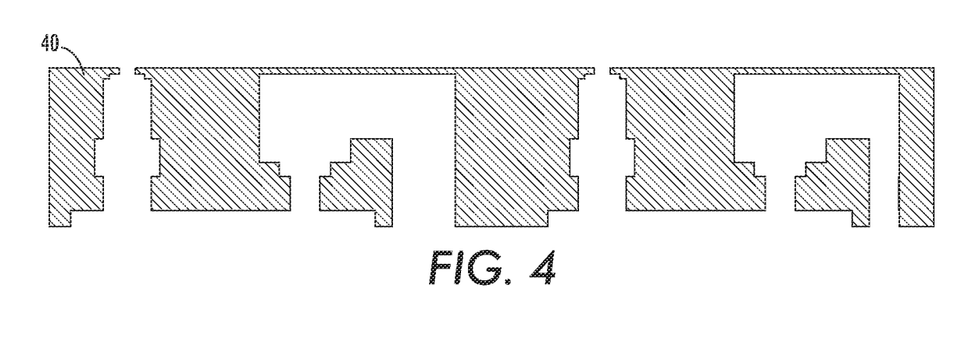

Next, the sacrificial form 26 of FIG. 2 is cast or coated with a final printhead subassembly layer to form a coating 30 as depicted in FIG. 3. Coating 30 can be a liquid material which is poured around form 26 to fill a mold (not depicted for simplicity) and then cured to form a solid body or structure 40 (FIG. 4). Coating 30 can also be a material which is deposited using, for example, chemical vapor deposition (CVD). In an embodiment, coating 30 can include a thin conformal layer 63 (FIG. 5) which contacts the form 26, such as a release layer, a chemical barrier, or a low friction layer which enhances the flow of ink through the completed device, followed by the formation of a bulk material which forms the majority of the coating 30. In any case, the composition of coating 30 is a material which allows removal of the sacrificial form 26 from the solidified coating 30. In an embodiment, coating 30 is a material which, after any required curing process, has a higher melting point than the material of the form 26. In this process, the FIG. 3 structure can be heated such that form 26 melts and flows out of the form 30 through an opening in the coating 30. In an embodiment, form 26 can be a material which sublimates from a solid to a gas. In another embodiment, form 26 is exposed to a solvent which dissolves form 26 but does not dissolve coating 30. Thus coating 30 can be a heat-curable epoxy encapsulant, a resin encapsulant, a material which can cure using a two-part room temperature cure, an ultraviolet-(UV-) curable material, a material which can be snap cured at a high temperature over a short duration, or an injection-molded polymer. Coating 30 may also be, for example, parylene or a metal such as nickel formed using, for example, an electroless plating process followed by conventional electroplating.

In an embodiment, a level of the coating 30 is applied up to the top of layer 24 to provide a plurality of nozzles (openings) in layer 30 through which ink will be dispensed during printing. In another embodiment, the coating 30 is applied to cover layer 24, the coating 30 is cured, and the top of the coating 30 is planarized using a mechanical or chemical etch to remove a sufficient amount of coating to expose layer 24 to provide the nozzles, and the form material is removed. In yet another embodiment, the coating 30 is applied to cover layer 24, the coating is cured, and nozzles are formed within layer 30 using a technique such as mechanical drilling, laser drilling, or masking the coating and exposing the masked coating to an etchant such as a wet etch or an isotropic or anisotropic dry etch.

After forming a structure similar to that depicted in FIG. 3 including cured coating 30, the base 10 is separated from the coating 30 and from the form 26. The form 26 is then removed from the coating 30 using a appropriate technique as described above to result in a printhead subassembly or printhead body 40 similar to that depicted in FIG. 4.

Subsequently, any additional processing is completed. Additional processing can include the formation of conformal coatings 63 (FIG. 5) on the bulk material of the printhead subassembly 40. Coating 63 can be, for example, a conformal coating which has a lower friction than the bulk material 40 and is configured to improve the flow of ink through the printhead subassembly 40. Coating 63 can also be a chemical barrier which can reduce chemical damage to the bulk material 40 by an ink which flows through the printhead subassembly 40 during use of the printhead. Additional processing can also include polishing and/or the removal of any flash or burrs.

Figure 5:
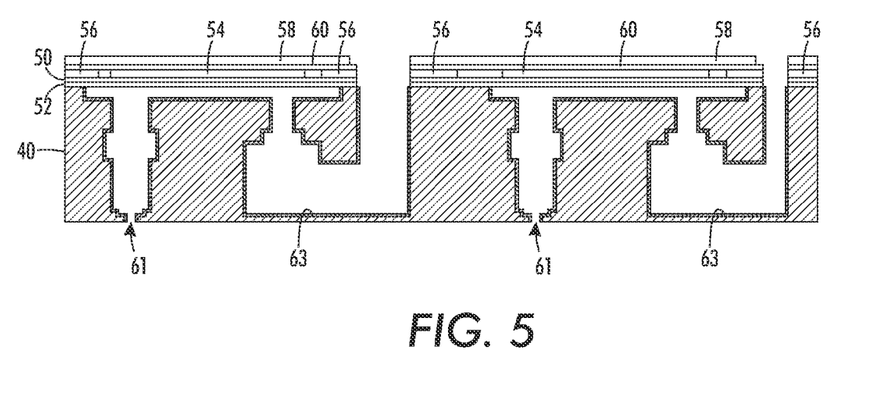

After the printhead subassembly 40 is complete, additional printhead structures can be attached thereto. FIG. 5 depicts the printhead subassembly 40 of FIG. 4, and further depicts a membrane or diaphragm 50 attached to the printhead subassembly 40 with a diaphragm adhesive 52. FIG. 5 further depicts a plurality of piezoelectric transducers (i.e., PZTs, piezoelectric actuators) 54 and a standoff layer 56 both attached to the diaphragm 50, and a circuit layer 58 attached to the plurality of piezoelectric transducers 54 and to the standoff layer 56 with an adhesive 60. The printhead assembly 40 further includes a plurality of nozzles 61 through which ink is dispensed during printing, wherein the nozzles 61 are provided by the material which forms the remainder of the printhead subassembly 40. Other printhead structures such as an ink reservoir (not depicted for simplicity) can be attached to the FIG. 5 structure to form a completed printhead. The printhead subassembly or printhead body 40 can thus provide a plurality of (or all) printhead structures between the diaphragm attach material 52 and the aperture plate (in this embodiment, the portion defined by layer 24 in FIG. 2) having a plurality of nozzles (defined by layer 26 in FIG. 2), including the aperture plate.

Figure 6:
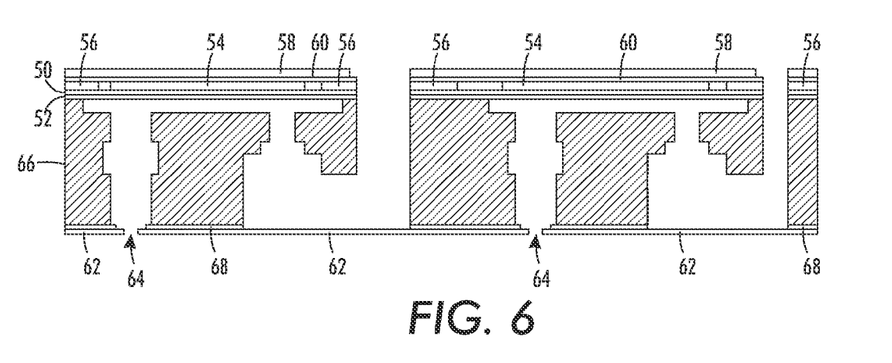
FIG. 6 is a cross section depicting a printhead subassembly according to another embodiment of the present teachings.

Other embodiments of the present teachings are contemplated which will become apparent from the present disclosure to one of ordinary skill in the art. For example, a printhead using another ejection technology such as electrostatic ejection technology can be formed using an embodiment of the present teachings, and other printhead designs including ink channels are contemplated. Additionally, other fabrication methods can be used to form a separate aperture plate from, for example, stainless steel. In this embodiment, an aperture plate 62 having a plurality of nozzles therein 64 as depicted in FIG. 6 is formed using conventional fabrication techniques. A printhead subassembly or printhead body 66 in accordance with the present teachings is fabricated, for example using a sacrificial form similar to form 26 according to the FIG. 2 structure, with the form omitting layers 22 and 24. As depicted in FIG. 6, the aperture plate 62 is attached to the printhead subassembly 66 using an aperture plate adhesive layer 68. Other structures such as diaphragm 50, PZT 54, and circuit layer 58 can also be attached to result in a structure similar to that depicted in FIG. 6. In this embodiment, structures which require different or more precise fabrication techniques can be manufactured separately and attached to a printhead body or subassembly fabricated according to the present teachings. The printhead subassembly or printhead body 66 can provide a plurality of (or all) printhead structures between the diaphragm attach material 52 and the aperture plate adhesive 68, wherein the aperture plate 62 is attached to the printhead body 66 with the aperture plate adhesive 68.

Figure 7:
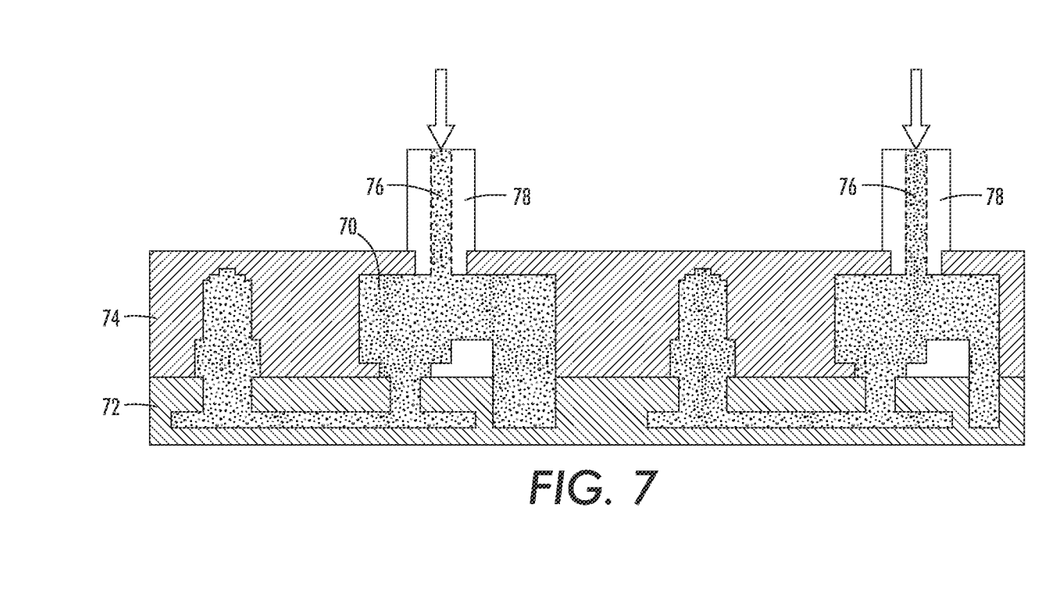
FIG. 7 is a cross section depicting an injection molding process to fabricate a sacrificial form according to an embodiment of the present teachings.

In another embodiment, an entire form such as form 26 of FIG. 2 can be manufactured as a single piece, for example using injection molding as depicted in FIG. 7 to provide form 70. The assembly of FIG. 7 includes a first mold plate 72 and a second mold plate 74. The two mold plates 72, 74 are placed in contact with each other under pressure, then flowable form material is pumped through a channel 76 within an injection molding tip 78 and into an opening formed by the two mold plates 72, 74. The flowable material is cured within the mold and removed to result in a sacrificial form 70, which is used to form a printhead subassembly according to the embodiments discussed herein.

A sacrificial form similar to form 70 can also be printed as a single piece using a printer such as a 3D printer or an ink jet material printer. Methods such as laser sintering or fused deposition, as well as other techniques which provide the resolution and structure necessary to form the ink path, are also contemplated.

In an embodiment, a sacrificial form can be fabricated in two or more individual pieces. After curing, the pieces are assembled using, for example, ultrasonic bonding, an adhesive layer, and/or posts on one of the pieces which are press fit into holes in the other piece. The assembled sacrificial form can then be used to fabricate a printhead subassembly according to the embodiments discussed herein.

Additionally, the printhead subassembly such as printhead body 40 in FIG. 5 can be formed as two different structures (not depicted for simplicity) using two different sacrificial forms (not depicted for simplicity). After forming the two structures, they are attached together, for example using an adhesive. In an embodiment, an ink filter (i.e., rock screen, not depicted for simplicity) can be interposed between the first and second printhead structures to filter contamination from the ink during printing to reduce or prevent the nozzle clogging. This embodiment may be useful for printhead structures which cannot be provided using a mold.

Figure 8:
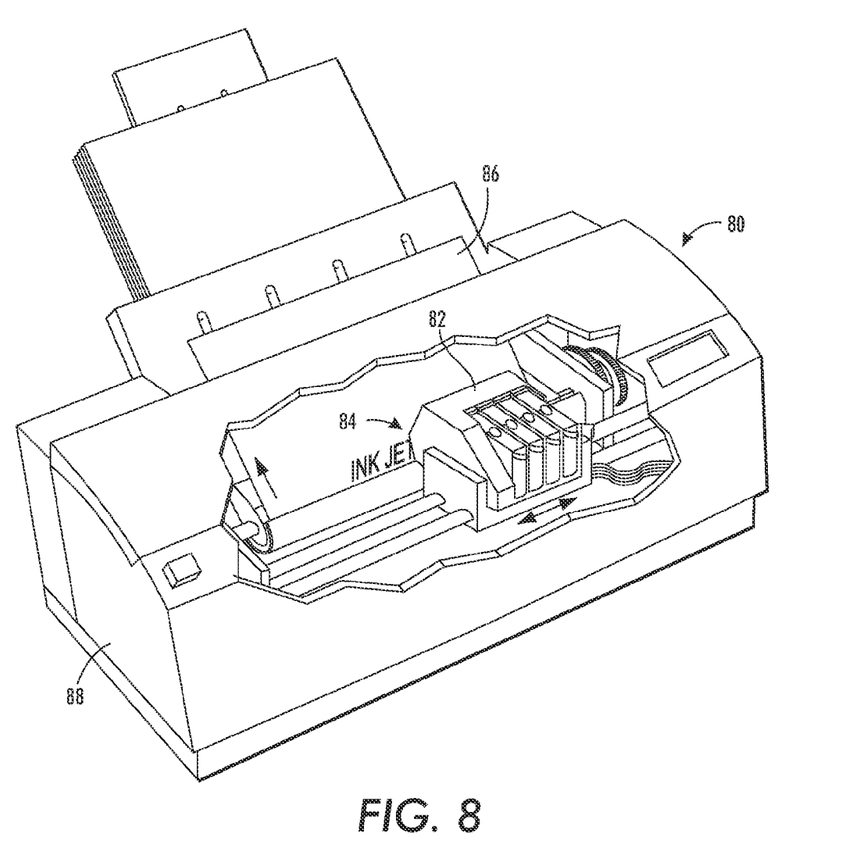
FIG. 8 is a perspective view of a printer according to an embodiment of the present teachings which can include a printhead fabricated using a sacrificial form.

Once manufacture of the printhead is completed, one or more printheads according to the present teachings can be used to form a printer. FIG. 8 depicts a printer 80 including one or more printheads 82 and ink 84 being ejected from one or more nozzles 61 (FIG. 5) in accordance with an embodiment of the present teachings. Each printhead 82 is configured to operate in accordance with digital instructions to create a desired image on a print medium 86 such as a paper sheet, plastic, etc. Each printhead 82 may move back and forth relative to the print medium 86 in a scanning motion to generate the printed image swath by swath. Alternately, the printhead 82 may be held fixed and the print medium 86 moved relative to it, creating an image as wide as the printhead 82 in a single pass. The printhead 82 can be narrower than, or as wide as, the print medium 86. The printer hardware including the printhead 82 can be enclosed in a printer housing 88. In another embodiment, the printhead 82 can print to an intermediate surface such as a rotating drum or belt (not depicted for simplicity) for subsequent transfer to a print medium.

Thus the various process embodiments described herein may allow the formation of a printhead which has a reduced number of printhead components and material interfaces compared with some current methods and structures. In contrast to a printhead which can include many metal and polymer layers laminated and/or brazed together using a number of adhesive layers, a printhead subassembly in accordance with an embodiment of the present teachings can be fabricated as a solid printhead body using a single material. In an embodiment, a sacrificial form can be coated with a suitable material such as an epoxy or other encapsulant. In another embodiment, the sacrificial form can be coated using a deposition process such as that used for parylene, or with a plating process such as an electroless nickel plating process to form a metal coating. The sacrificial form may be removed by melting and draining, or using a solvent to dissolve the sacrificial material. This process thus can form a printhead body including one or more internal ink channels or passageways for the flow through a printhead. The printhead body may be bonded to a printhead diaphragm and PZT layer to form a front end of a printhead jet stack. Various embodiments can provide for the formation of structures such as "blind" features which may be unrealizable using conventional molding (e.g., injection molding) techniques. For example, separator layer 102 in FIG. 9 includes a wider opening than overlying vertical inlet 104 and underlying inlet/outlet plate 100. A lost wax or similar embodiment of the present teachings can be used to form an analogous larger opening (or a different blind feature) to result in the FIG. 5 structure, which could not be formed as a single body 40 as depicted using injection molding due to inherent processing constraints. Printhead nozzles or apertures 61 may also be formed using a lost wax process as discussed above, or may be laser ablated or etched at a later time. Further, embodiments of the present teachings can reduce the number of printhead components and interfaces compared to some other processes, and may have reduced manufacturing complexity and cost with improved yield and lifetime.

In an additive process to fabricate a sacrificial form, for example sacrificial form 26 in FIG. 2, a support material may be provided for fragile features that are not sufficiently strong for self-support. The support material can become part of the completed printhead which is present in the printhead during printing.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. –1, –2, –3, –10, –20, –30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming a printhead, comprising:
   forming a sacrificial form over a base;
   coating the sacrificial form with a liquid coating material, using a method comprising:
      coating a first portion of the sacrificial form with the liquid coating material to define a plurality of ink channels through the liquid coating material, where the plurality of ink channels configured for flowing ink through the printhead;
      coating a second portion of the sacrificial form with the liquid coating material to define a plurality of nozzles through the liquid coating material configured for ejection of ink from the printhead through the plurality of nozzles during printing wherein, subsequent to the coating of the second portion of the sacrificial form, at least part of the second portion of the sacrificial form remains exposed and extends through the liquid coating material; and
      curing the liquid coating material to form a cured coating material subsequent to coating the first portion and the second portion of the sacrificial form;
   separating an entirety of the base from the cured coating material and from the sacrificial form;
   after separating the entirety of the base from the cured coating material and from the sacrificial form, removing the first portion of the sacrificial form from the cured coating material to form the plurality of ink channels through the cured coating material; and
   removing the second portion of the sacrificial form from the cured coating material to form the plurality of nozzles, wherein the removal of the first and second portions of the sacrificial form provides a printhead subassembly comprising the cured coating material.

2. The method of claim 1, further comprising melting the sacrificial form to remove the first and second portions of the sacrificial form from the cured coating material.

3. The method of claim 1, further comprising dissolving the sacrificial form using a solvent to remove the first and second portions of the sacrificial form from the cured coating material.

4. The method of claim 1, further comprising:
   attaching an aperture plate to the printhead subassembly, wherein the aperture plate comprises a plurality of nozzles.

5. The method of claim 1, further comprising fabricating the sacrificial form using a method comprising stacking a plurality of sacrificial layers on the base to provide a three dimensional patterned form.

6. The method of claim 1, further comprising:
   fabricating the sacrificial form using a method comprising stacking a plurality of wax layers on the base to provide a three dimensional patterned form;
   coating the three dimensional patterned form with the liquid coating material; and
   melting the wax layers to remove the sacrificial form from the cured coating material.

7. The method of claim 1, further comprising:
   fabricating the sacrificial form using a method comprising stacking a plurality of thermoplastic layers on the base to provide a three dimensional patterned form on the base;
   coating the three dimensional patterned form with the liquid coating material; and
   after separating the base from the cured coating material and from the sacrificial form, dissolving the thermoplastic layers in a solvent to remove the sacrificial form from the cured coating material.

8. The method of claim 1, further comprising:
   injecting a flowable sacrificial form material into an injection mold having at least two mold plates; and
   curing the flowable sacrificial form material within the at least two mold plates to form the sacrificial form as a single piece.

9. The method of claim 1, further comprising:
   attaching a diaphragm to the printhead subassembly using a diaphragm attach material; and
   attaching a plurality of actuators to the diaphragm,
   wherein the formation of the printhead subassembly forms a printhead body from a single piece of coating material which provides a plurality of printhead structures between the diaphragm attach material and an aperture plate including the aperture plate, and the aperture plate comprises a plurality of nozzles therein.

10. The method of claim 9, further comprising:
    forming a plurality of nozzles in the printhead subassembly using at least one method comprising mechanical drilling, laser drilling, or exposing the coating to an etchant.

11. The method of claim 1, further comprising:
    attaching a diaphragm to the printhead subassembly using a diaphragm attach material;
    attaching a plurality of actuators to the diaphragm; and
    attaching an aperture plate to the printhead subassembly using an aperture plate adhesive,
    wherein the formation of the printhead subassembly forms a printhead body from a single piece of coating material which provides a plurality of printhead structures between the diaphragm attach material and an aperture plate adhesive.

12. The method of claim 1, wherein the liquid coating material is a conformal coating and the method further comprises:
    forming a bulk material which contacts the liquid coating material, wherein the liquid coating material is at least one of a release layer, a chemical barrier, and a layer which enhances the flow of ink through the ink channel.

13. The method of claim 1, wherein the sacrificial form is a single piece of one of a wax, a solid ink, or a thermoplastic.

* * * * *